Dec. 28, 1948.  W. S. LANSING  2,457,163
PLOW ATTACHMENT FOR TRACTORS
Filed March 13, 1945  2 Sheets-Sheet 1
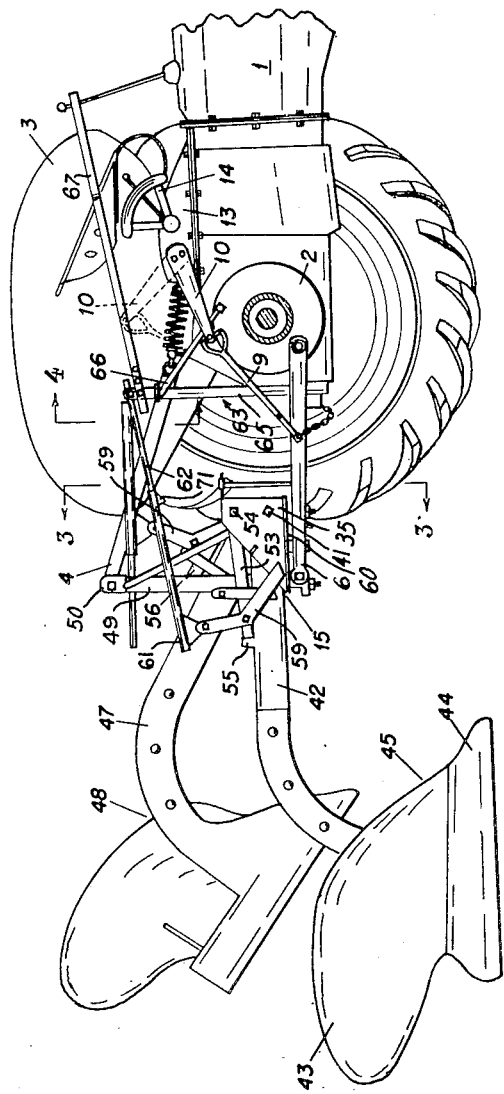
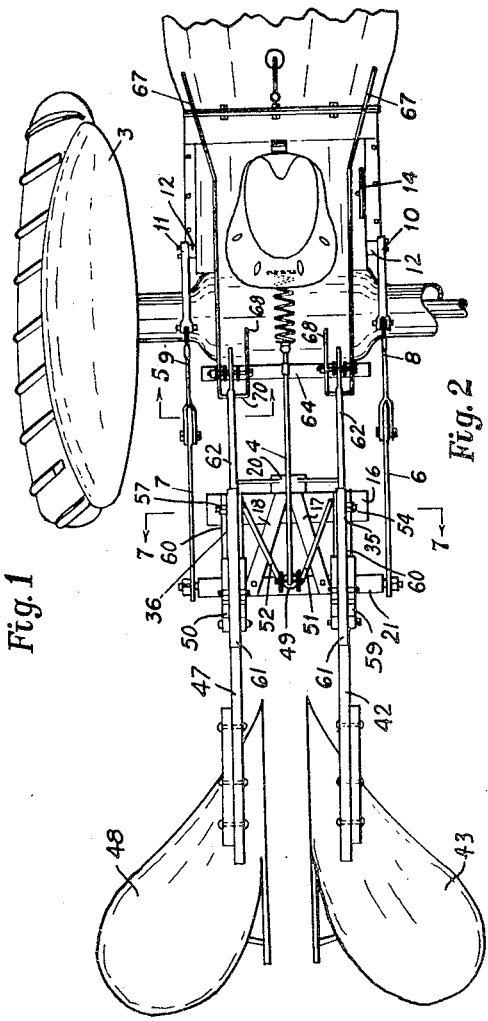
WARREN S. LANSING
INVENTOR.
BY
*H. A. McGrew*
ATTORNEY Dec. 28, 1948.  W. S. LANSING  2,457,163
PLOW ATTACHMENT FOR TRACTORS
Filed March 13, 1945  2 Sheets-Sheet 2
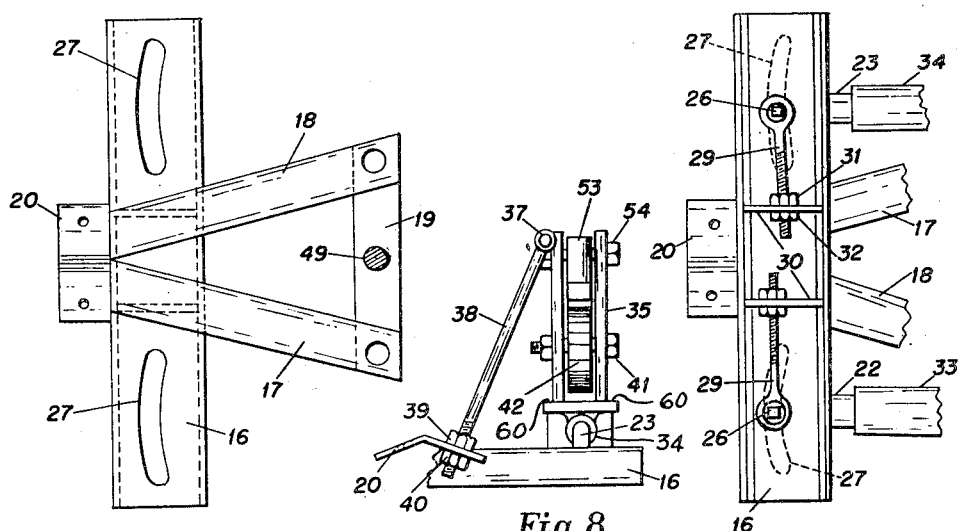
Fig. 6  Fig. 8  Fig. 7
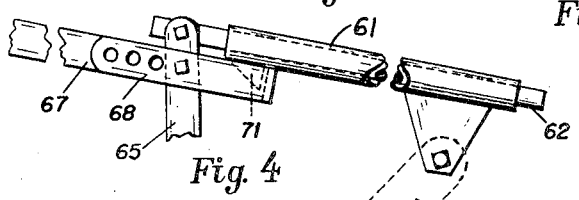
Fig. 4
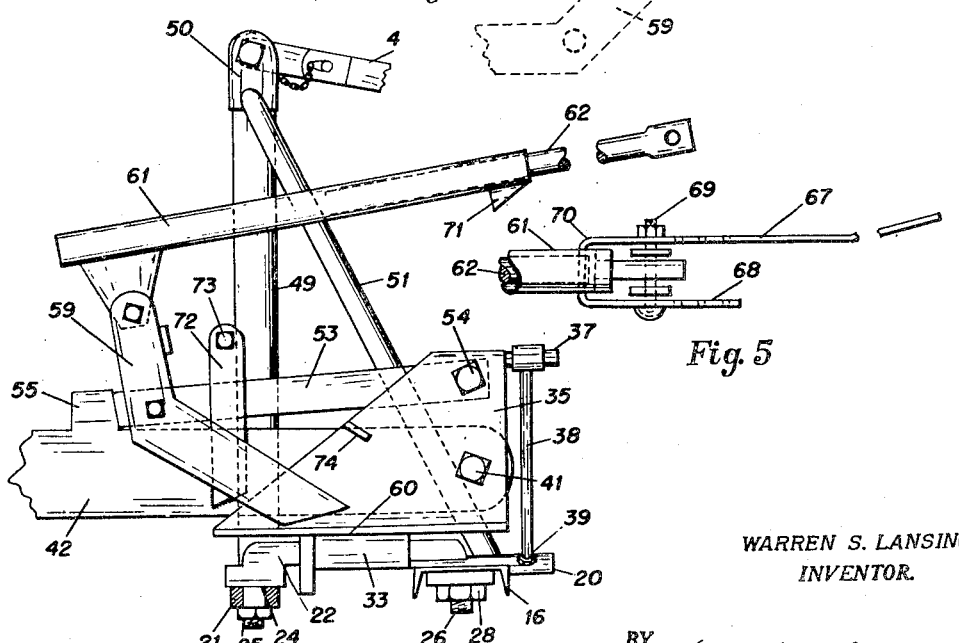
Fig. 5
Fig. 3
WARREN S. LANSING
INVENTOR.
BY
ATTORNEY Patented Dec. 28, 1948

2,457,163

UNITED STATES PATENT OFFICE 2,457,163

PLOW ATTACHMENT FOR TRACTORS

Warren S. Lansing, Loveland, Colo.

Application March 13, 1945, Serial No. 582,432

4 Claims. (Cl. 97—29)

1

This invention relates to plows and more particularly to two-way plows for use with farm tractors.

One of the objects of the invention is to provide an improved connecting and lifting mechanism for a plow of the type referred to.

Another object of the invention is to provide improved individual control means for the plow beams of a two-way plow which is arranged to be attached to a tractor.

A more specific object is to produce an improved two-way plow for use with a tractor having what is known as the "Ferguson System" and which can be readily attached and detached therefrom and the plows lifted and lowered under the control of its hydraulic pressure system.

A further object is to produce an improved plow of the type referred to which embodies means for positively holding a plow in the ground at varying depths.

A further object is to embody in a plow simple means for adjusting the plow beam so as to vary both the tilt and the lead of the plow bottom.

A further object is to provide easily operated latch means for holding either or both plows in a lifted position and for individually releasing the plows.

A still further object is to produce an improved two-way plow which is of simple construction, can be easily and cheaply manufactured, is readily controlled and efficient in its plowing operation.

Other objects of the invention will become apparent from the following description taken in connection with the accompanying drawing in which Figure 1 is a side view of a two-way plow embodying my invention, said view showing the plow attached to a tractor with one plow beam in lifted position and the near rear tractor wheel removed to better disclose the plow structure and its manner of attachment.

Figure 2 is a top view of the structure shown in Figure 1, but showing both plow beams in lowered positions;

Figure 3 is an enlarged side view of the head structure with which the forward ends of the plow beams are associated;

Figure 4 is a side view of the latching means for holding each plow beam in lifted position, the means being shown in latched position;

Figure 5 is a top view of the latching means in latched condition;

Figure 6 is a top view of the cross beam and attached braces to which the clevises for the plow beams and the draw bar are attached;

2

Figure 7 is a bottom view of the cross beam showing the adjusting means for changing the lead of the plow bottom; and Figure 8 is a front view of the beam, the clevis and tilt adjusting mechanism.

Referring to the drawings in detail the numeral 1 indicates a rear portion of a tractor of known construction which has the usual differential housing 2 and rear wheels 3 (one only being shown). This tractor is equipped with what is known as the "Ferguson System" and with which my improved two-way plow is preferably associated. As is well known, this system has a compression link 4 and right and left hand tension links (as viewed from the rear) indicated, respectively, at 6 and 7 in Figure 2. These tension links are connected by rods 8 and 9 to arms 10 and 11 which are operated by an hydraulically actuated lift shaft 12 (see Fig. 2) which has connected thereto an hydraulic motor positioned within a suitable housing 13 operated by fluid pressure from a pump, not shown. The admission of liquid under pressure to the fluid motor and release therefrom is controlled by a lever mechanism 14. When the fluid motor is operated the rods 8 and 9 will lift up the outer ends of the tension links 6 and 7, respectively, and when the liquid under pressure in the fluid motor is released the tension links are permitted to be lowered.

In accordance with my invention, the two-way plow is constructed with a head assembly generally indicated by the numeral 15. This head assembly has a transverse member or beam 16 to which is welded to its top, two frame members 17 and 18 which extend rearwardly in a diverging direction, as best seen in Figure 6. The rear ends of these members are connected by a cross frame member 19 which is welded thereto. The beam also has welded thereto at the forward end of the members 17 and 18 a plate 20. At the rear ends of the diverging members 17 and 18 and below the member 19 there is bolted thereto a draw bar 21 extending parallel to the beam 16. The right end of this draw bar (as viewed from the rear) is connected to the previously mentioned tension link 6 of the hydraulically operated mechanism and the left end of the draw bar is connected to the tension link 7 of said hydraulic mechanism, all as best shown in Figure 2.

Between the draw bar 21 and the beam 16 are right and left rods 22 and 23, each of which has on its rear end a threaded extension 24 which fits into a hole in the draw bar, whereby these rear ends of the rods may be bolted to the draw bar by nuts 25. The forward ends of these rods are also provided with threaded extensions 26 which are adapted to extend through arcuate slots 27 in the beam on opposite sides of its center. These arcuate slots have a radius of curvature, the axis of which coincides with the axis of the threaded extensions 24, thus permitting the forward ends of the rods 22 and 23 to be swung inwardly and outwardly on the cross beam. The extensions 26 of the rods which extend through the arcuate slots are provided with nuts 28 for clamping the forward ends of the rods to the beam. Each extension 26 also has mounted thereon an eye-bolt 29 inserted between the nut 28 and the lower surface of the beam. These eye-bolts extend through cross pieces 30 on the under side of the beam and are arranged to be clamped thereto by nuts 31 and 32 on opposite sides of each cross piece. Thus by this arrangment of the eye-bolt and the nuts the end of each rod 22 and 23 can be adjusted and firmly held in any desired position in the arcuate slot. When an adjustment is desired to be made the nut 28 on the extension of each rod is loosened and the nuts 31 and 32 so manipulated as to shift the forward end of the rod in the desired direction in its arcuate slot. When the adjustment is completed the nuts are again tightened.

The rod 22 has positioned thereon a tubular member 33 and a like tubular member 34 is positioned on the rod 23. These tubular members 33 and 34 have welded thereto clevises 35 and 36 of like construction. Each clevis has a general U-shaped cross section and to the upper forward end is welded a pin 37. Pivotally mounted on each of these pins is a brace rod 38 which has a lower threaded end extending through a suitable hole in the previously mentioned plate 20 welded to the forward part of the beam 16. The threaded end of each rod 38 carries clamping nuts 39 and 40 for holding the lower end of the rod in plate 20 and at the same time permit its longitudinal adjustment. This adjusting arrangement for the brace rods permits tilting adjustment of the clevises 35 and 36 about their respective rods 22 and 23, upon which they are pivotally mounted. Thus the clevises can be positioned in a vertical position or tilted to either side of this vertical position, as desired, and firmly held in any such position.

The right hand clevis 35 has pivotally connected thereto, by means of a pin 41, the forward end of a plow beam 42 which has secured at its rear end the usual mold board 43 and plow bottom 44 to thus provide the right hand plow 45 of the two-way plow. In a similar manner the left hand clevis 36 has pivotally connected thereto, by a pin, the forward end of a plow beam 47 having mounted on its rear end the plow 48. This plow is constructed with the usual mold board and plow bottom and is arranged to be the left hand plow of the two-way plow. The pivotal connection of the forward ends of the plow beams to the clevises permit relative pivotal movement between the clevises and the beams, the reason for which will become apparent.

At the center of the cross frame member 19 of the head assembly there is welded thereto an upstanding post 49 extending some distance above the clevises and at the upper end of this post there is provided a stirrup 50. The post is braced by two rods 51 and 52 which are welded at their upper ends to the upper end of the post and at their lower ends to the cross beam 16. The stirrup end of the post is pivotally connected to the end of the previously referred to compression link 4 of the tractor system.

Clevis 35 also has mounted thereon a locking bar 53 which is pivoted to the clevis at its forward end by means of a pin 54 positioned above the pin 41 by means of which the plow beam 42 is pivoted to the clevis. This locking bar extends rearwardly and its rear end is arranged to be engaged by a block 55 which is an integral part of or may be welded to the top of the plow beam. This bar and its cooperation with the block provides means for positively preventing rotation of the plow beam about the clevis and thus if the clevis is held fixed it will be impossible for the plow beam to be raised by a pivotal movement about its pin 41. In a similar manner a locking bar 56 is pivoted to the left hand clevis 36 by means of a pin 57 and the rear end of this bar cooperates with a block welded to the top of the left hand plow beam 47 to provide a locking means to hold this left plow beam from pivoting relatively to its clevis.

The locking bars 53 and 56 which are associated with the plow beams 42 and 47, respectively, each have pivotally mounted thereon adjacent their rear ends preferably a pair of bell-crank levers 59 which are employed to move the bars upwardly to an unlocking position so that the rear end of each bar will be out of the path of and will permit the movement of a block 55 under the bar and will thus permit the pivotal movement of the plow beam with which it is associated. The lower ends of each pair of bell-crank levers are arranged to cooperate with lateral extensions 60 on the sides of the bases of the clevises. To the upper ends of the bell-crank levers are pivotally connected tubular rods 61 each of which has slidable therein a rod 62, the forward end of each rod 62 being arranged to be pivotally connected to the top of a frame 63 secured to the differential housing of the tractor. This frame comprises a top cross piece 64, posts 65 secured to the differential housing, and supporting braces 66. Similar levers 67 are pivotally mounted upon the top of the crosspiece 64 adjacent its left and right ends, see Fig. 2. Each lever 57 has a turned-back end portion 68 through which a pivot pin 69 extends, see Fig. 5. The forward ends of the levers are arranged to extend on opposite sides of the tractor operator when seated on the tractor seat. The portion 70 of the turned back end of each lever provides a holding means for a catch lug 71 which is carried on the forward end of each tubular rod 61.

In order to stop the upward swinging of the locking bars 53 and 56 at a point where they are free to clear the blocks on the plow beams, the plow beams have welded thereto pairs of upstanding bars 72 which are connected at their top by stop pins 73 against which the bars can engage. The bars 72 and stop pins also are effective along with the locking bars, the bell-crank levers and the lateral extensions 60 on the clevises to hold the plow beams in lifted positions as will be later described. The extent of swinging of the bell-crank levers in a direction away from the extensions of the clevises is also limited by blocks 74 which are welded to the sides of the clevises, see Fig. 3.

Referring to the operation of my two-way plow, let it first be assumed that both plows are in their down position. Under these conditions the rear ends of the locking bars 53 and 56 will abut the front surfaces of the blocks carried by the tops of the plow beams. The bell-crank levers will be in a position to permit this condition of the locking bars as the catch lugs 71 will be freed from the levers 67 and consequently the tubular rods 61 will be slid rearwardly on the rods 62 pivoted to the frame 63. This condition is illustrated in Figure 3.

If it should be desired to use only one plow, as for example the right hand plow, the hydraulic mechanism will be caused to be operated. This will result in the tension links 6 and 7 being rotated upwardly about their pivotal connection with the tractor. Consequently the whole head structure to which the forward ends of the plow beams are connected will be moved upwardly and swung about the pivotal connection between the top of the post 49 and the compression link 4, said compression link also swinging upwardly a limited extent. This will bring both plows up to a raised position such as the position shown in Figure 1 with respect to the left hand plow 48. As the plows are raised both tubular rods 61 will slide forwardly on the rods 62 until the catch lugs 71 on the forward ends thereof are locked with the levers 67. Both of the plow beams are now being held in their lifted positions and will continue to be so held as long as the catch operating levers 67 are not moved to free them from the catch lugs 71, and regardless of whether the hydraulic mechanism is released. If the hydraulic mechanism should be released, then the head, that is the draw bar, cross beam 16 and the clevises, together with the post 49, will assume the position shown in Figure 1, but the plow beams will be held upwardly by the bell-crank levers 59 due to the catch lugs being held latched. It will be noted that with these catch lugs latched, then as the draw bar is released by the hydraulic mechanism the bell-crank levers will pull the locking bars 53 and 56 up against the stop pins 73 carried by the bars 72. Since these bars 72 are secured to the plow beams, the plow beams in effect will be carried on the bell-crank levers, which levers have their lower ends resting upon the extensions 60 at the bases of the clevises. As the head, including the clevises, is returned to the position corresponding to that when both plow beams were down, then the lower ends of the bell-crank levers slide along the extensions 60 and thus continue to hold the plow beams raised.

If it should be desired to lower the right hand plow, for example, this can be done by merely operating the right hand lever 67 and releasing the catch lug. This will free the bell-crank lever and permit it to swing on its pivot which swinging will be forced by the action of the weight of the plow beam. When the plow beam 42 reaches its lowered position, the locking bar 53 will drop in front of the block 55 and thereby lock the plow beam from again pivoting upwardly on the clevis 35. To release the left hand plow beam the left hand lever 67 is operated to release the cooperating catching lug 71 and then a similar action takes place. If one plow beam is in raised position and the other plow beam is in lowered position and it is desired to reverse these positions, the hydraulic mechanism is operated to bring the lowered plow beam to the raised position where the catch lug will be latched. The hydraulic mechanism is then released and the plow beam which is desired to be lowered and has previously been in raised position is then allowed to become lowered by operating the proper lever.

Once the head to which the plow beams are connected is set, there is no possibility of the plows jumping out of the ground as this is prevented by the locking bars which prevent upward pivoting of the plow beam with respect to the clevises. The depth of plowing can be readily adjusted by manipulating the hydraulic mechanism so as to change the position of the draw bar with respect to the pivotal connection between the post 49 and the compression link. Once this condition is set the plow will remain at such set position. If it should be desired to change the tilt of either plow, this is quickly accomplished by tilting the plow beam. The adjustment for such is done by adjusting the nuts on the brace rods 38. By this adjustment a clevis is swung about its horizontal axis and thus a change in tilt given to the plow beam which in turn will tilt the plow bottom. If it is desired to adjust the lead of either plow, such is accomplished by shifting its clevis about a vertical axis, such vertical axis being its axis of connection with the draw bar. This adjustment is accomplished by loosening the nuts 28 and then adjusting an eye-bolt 29 by proper manipulation of the nuts 31 and 32. This swings the forward end of the rod on which the clevis is mounted and swings the beam about vertical axis of the extension 24.

Being aware of the possibilities of modifications in the particular structure shown and described, I do not intend that the scope of the invention embodied therein be limited except in accordance with the appended claims.

What is claimed is:

1. In a two plow construction for association with a tractor having a lifting and pulling mechanism including a link pivotally connected to the tractor, said plow structure comprising two beams each carrying a plow, a transverse member, means for pivotally connecting the forward ends of the plow beams to the transverse member, a draw bar secured to the transverse member and arranged to be connected to the lifting mechanism of the tractor, a post structure extending upwardly from the draw bar and adapted to have connected thereto the outer end of the link pivoted to the tractor to limit movement of the post away from the tractor as the draw bar and transverse member are lifted, means for preventing pivotal movement of each plow beam with respect to the transverse member, and means for disabling the last named means and holding at will each beam in a lifted position after the beam is lifted and the lifting mechanism is released.

2. In a two plow construction for attachment to a tractor having a lifting and pulling mechanism, two plow beams each carrying a plow, a draw bar, a transverse member, means for securing the draw bar and member together, means for securing the draw bar to the lifting and pulling mechanism, longitudinally extending spaced pivot rods carried by the draw bar and transverse member, a member pivoted to each pivot rod, means for pivotally connecting the forward end of each beam to a pivoted member at a point forward of the draw bar so that upon raising the draw bar the beam will be raised therewith, means for selectively holding at will the beams in raised positions and permitting relative pivotal movement of the draw bar, the transverse member, the pivot rods and members pivoted thereon to a lowered position, means for varying the direction of each axis of a pivot rod to vary the lead of the plow associated therewith, and means for adjusting each member about its pivot rod axis to vary the tilt of the plow associated therewith.

3. In a plow construction, a support structure having a longitudinally extending adjustable rod and a sleeve receiving said rod, a U-shaped clevis secured to said sleeve, a plow beam connected to the clevis at one side of the adjustable rod, a brace rod connected to the clevis remote from its connection to said sleeve and to the support structure, and means for adjusting the brace rod to vary the position of the clevis on the adjustable rod and its angular relation to the support structure.

4. In a plow construction for attachment to a tractor having a lifting and pulling mechanism, a supporting structure adapted to be connected to the lifting and pulling mechanism of the tractor, a pair of plow beams each carrying a plow, means for pivoting the forward ends of the beams to the supporting structure to permit the beams and plows to be raised with the supporting structure, but allowing the structure and one of the beams to be lowered independently of the other beam, means for holding the first-named beam in raised position, means for preventing relative pivotal movement between the supporting structure and the beams comprising a bar pivoted to the supporting structure and a cooperating engageable shoulder on said beam, a lever pivoted to the locking bar and arranged to cooperate with the supporting structure to unlock the bar, means for causing the lever to assume unlocking position, and means including the lever, the actuating means, and the locking bar for holding a beam and a plow in raised position and permitting independent lowering of the supporting structure with the other plow.

WARREN S. LANSING.

REFERENCES CITED

The following references are of record in the file of this patent:

UNITED STATES PATENTS

| Number | Name | Date |
| --- | --- | --- |
| 1,302,339 | Esping | Apr. 29, 1919 |
| 1,733,914 | Shiller | Oct. 29, 1929 |
| 1,832,010 | Gallagher | Nov. 17, 1931 |
| 1,864,639 | Crezee | June 28, 1932 |
| 2,156,569 | Lindgren et al. | May 2, 1939 |
| 2,249,861 | Silver | July 22, 1941 |
| 2,366,281 | Mott | Jan. 2, 1945 |
| 2,401,837 | Mellen et al. | June 11, 1946 |
| 2,424,192 | Rogers et al. | July 15, 1947 |

FOREIGN PATENTS

| Number | Country | Date |
| --- | --- | --- |
| 544,041 | Great Britain | Mar. 25, 1942 |
| 556,859 | Great Britain | Jan. 21, 1943 |
| 629,858 | Germany | May 15, 1936 |